United States Patent [19]

Moore et al.

[11] 4,264,538
[45] Apr. 28, 1981

[54] LIQUID DISTRIBUTOR

[75] Inventors: Frank D. Moore, Tallmadge; Thomas J. Deep, Kent, both of Ohio

[73] Assignee: Norton Company, Worcester, Mass.

[21] Appl. No.: 149,867

[22] Filed: May 14, 1980

[51] Int. Cl.³ .............................................. B01F 3/04
[52] U.S. Cl. ..................................... 261/97; 239/193; 261/DIG. 44
[58] Field of Search ................................... 261/94–98, 261/110, 111, 114 R, DIG. 44, DIG. 72; 202/158; 239/193

[56] References Cited

U.S. PATENT DOCUMENTS

| 930,926 | 8/1909 | Bentley | 239/193 |
|---|---|---|---|
| 2,590,779 | 3/1952 | Lehmann | 261/97 |
| 3,006,623 | 10/1961 | Ross et al. | 261/110 |
| 3,011,723 | 12/1961 | Van Weele | 239/193 |
| 3,290,025 | 12/1966 | Engalitcheff, Jr. | 261/97 X |
| 3,392,966 | 7/1968 | Eckert | 261/97 |
| 3,916,021 | 10/1975 | Hajek et al. | 202/158 X |
| 3,937,769 | 2/1976 | Strigle, Jr. et al. | 261/DIG. 44 |
| 4,159,291 | 6/1979 | Bruckert et al. | 261/114 R |

Primary Examiner—Richard L. Chiesa
Attorney, Agent, or Firm—Walter Fred

[57] ABSTRACT

A low flow liquid distributor and redistributor for a liquid/gas contact tower comprises: one or more receptacles each extending over a cross sectional area of the tower chamber and adapted to receive a source of liquid supplied either directly thereto or indirectly from the source via liquid feed splitter means that divides and dispenses the liquid received to each receptacle. Each receptacle has at least one side wall including one or more metering weirs dividing the liquid flow into one or more streams directed against a liquid distribution drip plate situated relatively close to the sidewall of the receptacles. Each liquid distribution drip plate has an upper portion extending downwardly to a short horizontal wall both of which causes liquid to spread horizontally and fill the narrow space between it and the sidewall of the receptacle and flow downwardly over the horizontal wall, through apertures in an adjoining side portion and a lower serrated portion extending downwardly therefrom composed of a number of angularly disposed drip portions and edges adapted to direct and uniformly divide low rates of liquid flow over the cross sectional area of the liquid contact tower chamber and a bed of tower packing elements therein.

12 Claims, 13 Drawing Figures

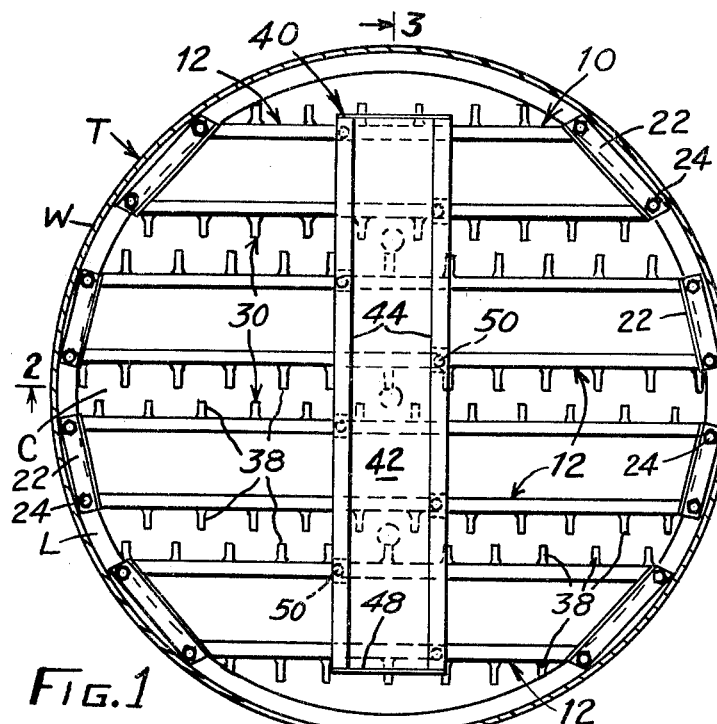
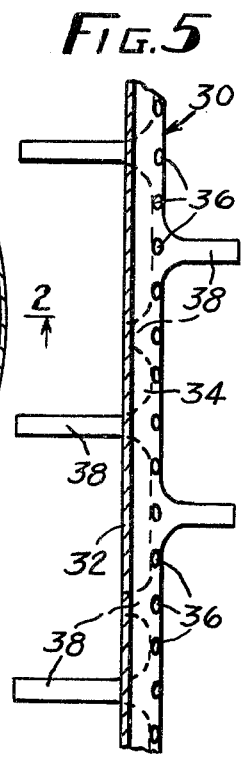
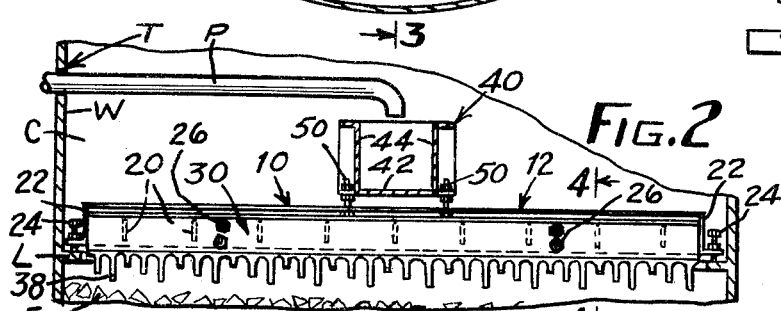
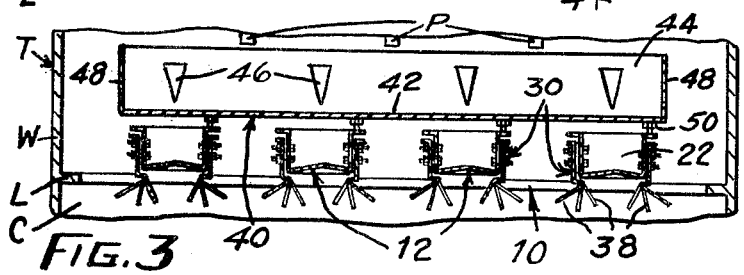
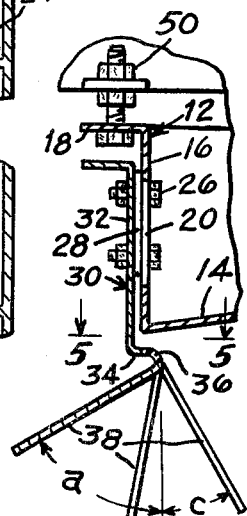

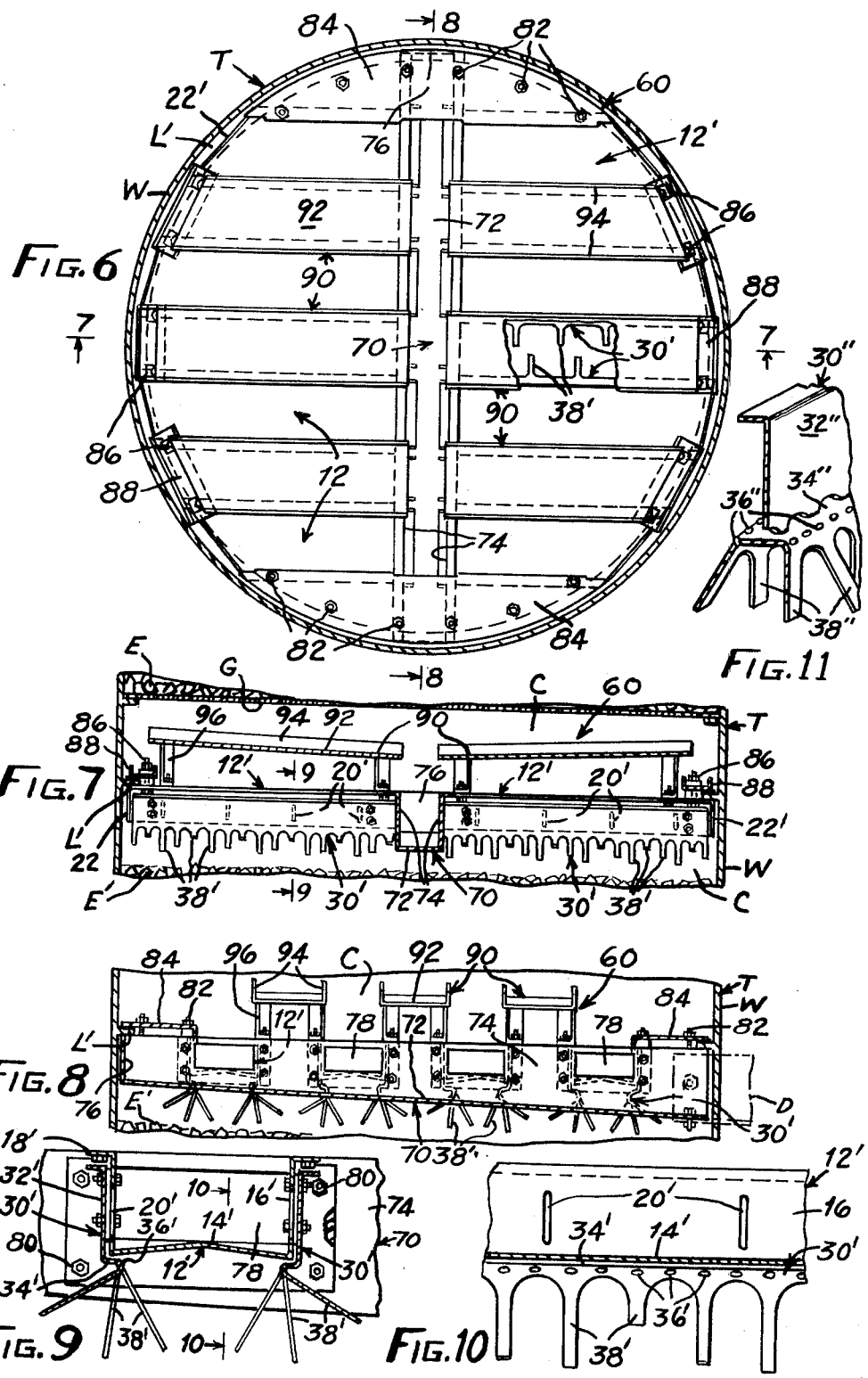

4,264,538

LIQUID DISTRIBUTOR

TECHNICAL DISCLOSURE

The invention relates to a liquid distributor and/or redistributor particularly for uniformly distributing relatively low rates of liquid flow over the cross sectional area of a bed of packing elements within a liquid/gas contact tower.

BACKGROUND ART

Heretofore a number of prior art liquid distributors have been developed and used to distribute liquid at low flow rates over a packed bed of media in a liquid/gas contact tower.

One such distributor disclosed in U.S. Pat. No. 3,937,769 provides continuous uniform distribution of liquid in numerous small streams approximately 8 points per ft$^2$ (86.11 pts/m$^2$) and at relatively low rates as low as 0.3 GPM/ft$^2$ (0.733 m$^3$/(hr.m$^2$)) of the cross sectional area of the tower chamber without causing unstable operation, entrainment of the gas and reducing the free gas space to much less than 50% of the cross section area of the tower chamber.

Also, a number of liquid distributors disclosed in U.S. Pat. Nos. 930,936; 3,916,020; 3,006,623; 3,011,723; 3,290,025; and 4,159,291 have either elongated or circular receptacles or troughs with weirs and a large number of drip elements, strips or fingers of various form projecting therefrom.

However, the prior art of which the Applicants are aware fail to suggest a liquid distributor or redistributor of any type or cross sectional configuration provided with a liquid distribution drip plate closely spaced from a side wall thereof that effectively spreads small streams of low liquid flow directed against it, horizontally into a uniform thin layer and distributes the downwardly flowing thin layer of liquid uniformly over a portion of the tower chamber.

In general the Applicants' distributor has the following desirable features:

1. A low flow range of 0.1 to 2 GPM/FT$^2$ (0.244 to 4.890 m$^3$/(hr.m$^2$)) with ratios of the highest to lowest permissable flow rates of up to 4 to 1 or more in a given design.
2. Substantially non-fouling.
3. Handles liquid viscosities of up to 30 centistokes or more.
4. Provides a low pressure drop to gas flowing (countercurrently to the liquid) past and through the distributor.
5. Collects and distributes liquid uniformly when fed from a suitable feed pipe and/or from liquid raining downwardly, uniformly or non-uniformly, from above.
6. Provides at least twelve (12) distribution points per square foot (129 points/m$^2$) of the cross sectional area of the tower chamber.

DISCLOSURE OF THE INVENTION

The invention comprises a low flow liquid distributor and/or redistributor for a liquid/gas contact tower comprising at least one receptacle or trough but preferably an array of spaced receptacles or troughs. The troughs or receptacles extend horizontally over portions of the cross sectional area of the tower chamber and are supported at closed ends thereof by a support or ledge extending inwardly from and around the wall of the tower chamber. Each receptacle has a bottom wall preferably with downwardly inclined surfaces diverging from the center of the bottom to at least one but preferably a pair of spaced opposite vertical side walls. Each side wall has longitudinally spaced narrow elongated vertical liquid metering slots, weirs or apertures through which liquid distributed to and rising above a predetermined level can flow in a plurality of small streams. The streams of liquid are directed against an upper portion of a liquid distribution drip plate extending longitudinally and relatively close to each side wall of the trough whereby the liquid spreads horizontally and quickly fills the small volume of space between them.

Each liquid distribution drip plate includes an upper non perforated portion which also extends downwardly close to the side wall of the trough, a short horizontal wall portion extending from one or both sides of the upper wall portion and below each side bottom edge portion of the trough or receptacle to a perforated side portion at a junction with a lower serrated portion extending downwardly from the perforated side portion.

The serrated portion comprises a plurality of longitudinally spaced drip fingers, or strips and edges projecting at various angles for uniformly dividing and distributing the continuous thin uniform layer of liquid flowing downwardly between the trough and the liquid distribution drip plate.

When utilized as an initial liquid distributor at the top of the tower chamber the distributor may further comprise a liquid feed splitter such as a parting box. The parting box extends transversely and centrally across the troughs and has its opposite ends closed off, a bottom wall and opposite sidewall with longitudinally spaced weirs which meter a portion of the liquid feed in the form of a continuos stream into each of the receptacles or troughs below.

In another embodiment disclosed the liquid feed splitter means is in the form of a central distribution trough or U-channel having an inclined bottom and spaced sidewalls extending between an upper closed end and a lower end either closed or adapted to drain off liquid. The sidewalls having apertures aligned with inner open ends or spaced receptacles or troughs, including attached distribution drip plates, outwardly from the opposite side walls of the channel to closed ends supported by the tower wall.

A further embodiment is disclosed for use as a liquid redistributor supportable in the tower between upper and lower beds of tower packing media in the chamber.

The redistributor comprises the above latter liquid distributor provided with a plurality of shallow inclined liquid collector drain pans situated above and covering the space between receptacles or troughs and draining liquid collected therein into the central feed splitter or channel. Also provided are side pans and channels covering the spaces between side receptacles or troughs and between outer upper ends of the inclined pans and the tower wall, and which collect and drain liquid to adjacent receptacles or troughs. Thus, liquid raining down from the bed of packing media above is collected by the pans, channels and receptacles or troughs for uniform redistributing to the bed below.

A still further embodiment disclosed comprises a liquid distributor with a single receptacle including a single continuous side wall extending upwardly from and around a bottom wall and a single liquid distribution drip plate extending around the side wall.

BRIEF DESCRIPTION OF THE DRAWINGS

FIG. 1 is a plan view of a liquid distributor of the invention supported within the tower chamber for initially and uniformly distributing liquid feed at the top of the tower chamber and above the upper most bed of tower packing elements therein.

FIG. 2 is a cross sectional view of the liquid distributor taken along line 2—2 of FIG. 1, through the feed splitter and showing one side of a trough or receptacle extending across the tower chamber and supported at opposite ends by a ledge projecting from the tower wall and a liquid distribution drip plate attached to the trough.

FIG. 3 is another cross sectional view of the liquid distributor taken along line 3—3 of FIG. 1 through the liquid feed splitter and the plurality of spaced receptacles and liquid distribution drip plates extending across the tower chamber;

FIG. 4 is an enlarged cross sectional view taken along line 4—4 of FIG. 2 showing a side wall portion of a trough and a liquid distribution drip plate attached relatively close to a sidewall of the trough;

FIG. 5 is a cross sectional view taken along 5—5 of FIG. 4 and showing the plurality of longitudinally spaced apertures and drip fingers displaced at various angles;

FIG. 6 is a plan view of a liquid redistributor or distributor of the invention supported within a tower chamber and adapted for collecting liquid draining from above or a bed of packing media supported above it and uniformly redistributing the collected liquid over the cross sectional area of the chamber and bed of packing media below;

FIG. 7 is a cross sectional view taken along line 7—7 of FIG. 6 through the collecting pans, the central trough and between adjacent troughs with liquid distribution drip plates attached thereto and supported by the ledge projecting from the tower chamber wall;

FIG. 8 is another cross sectional view taken along line 8—8 of FIG. 6 longitudinally through the central trough and showing the openings to the inner ends of the transversely extending troughs or receptacles attached to the sidewall of the central trough or channel;

FIG. 9 is a cross sectional view taken on line 9—9 of FIG. 8 through a receptacle or trough and the liquid distribution drip plates attached relatively close to each side wall thereof;

FIG. 10 is another cross sectional view taken along line 10—10 of FIG. 9 showing an enlarged inner portion of the side wall and spaced liquid metering elongated weirs or slots therein and a lower serrated portion of the liquid distribution drip plate;

FIG. 11 is perspective view of a portion of another embodiment of a liquid distribution drip plate;

BEST MODES OF CARRYING OUT THE INVENTION

Figure 12:
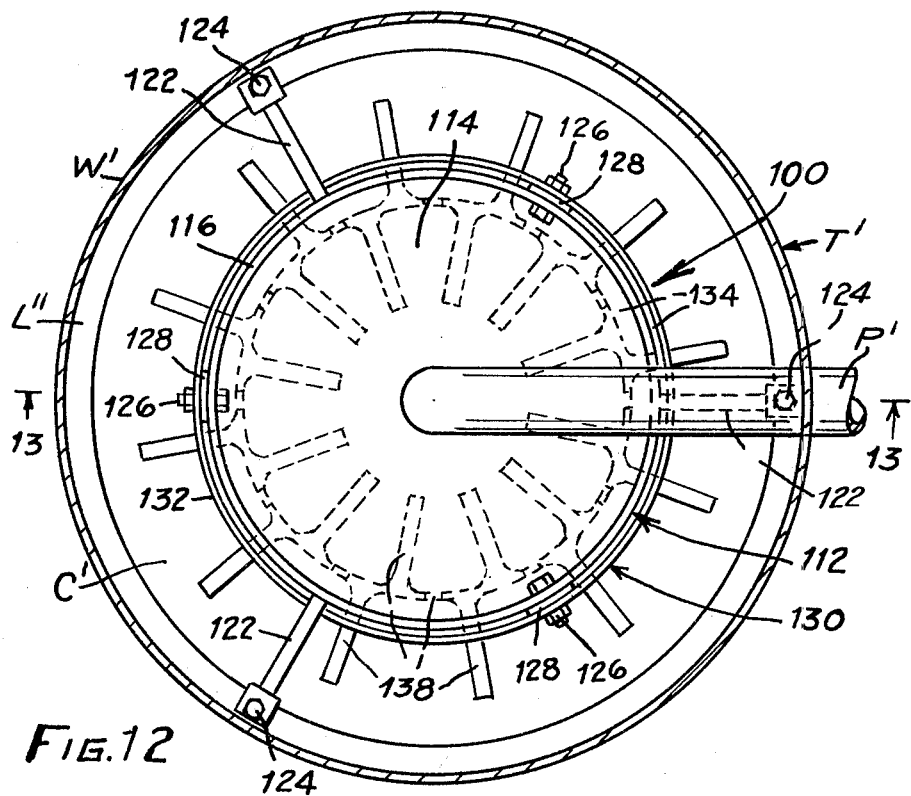
FIG. 12 is a plan view of another embodiment of the invention in which a liquid distributor has a single receptacle with a single side wall and a liquid distribution drip plate attached thereto.

A low flow liquid distributor 10 according to the invention and supportable by a support such as a ledge L extending inwardly about 1½" (3.81 cm) from and around the chamber wall W of a tower T or the like is shown in FIG. 1-5.

A typical liquid distributor 10 of about 53" (1.346 m) in diameter comprises an array or plurality of elongated troughs or receptacles 12 spaced from each other and extending over or across different portions of the cross sectional area of about 15.9 sq. ft. (1.477 m$^2$) of a chamber C of about 54" (1.371 m) diameter within the tower T.

As shown in FIG. 1 the inner more central right and left hand pair of long troughs or receptacles 12 are of substantially the same length and construction but longer than the substantially identical outer side pair of right and left hand short troughs or receptacles 12.

Preferably each of the receptacles or troughs 12 about 3" (7.62 cm) in height comprises a bottom wall 14 with inner slightly inclined surfaces diverging from the raised center ridge to lower or bottom edge portions of spaced opposite vertical side walls 16. Typically, the side walls 16 are spaced 5½" (13.97 cm) apart and extend upwardly to outwardly extending short horizontal flange portions 18 and have a plurality of longitudinally spaced elongated narrow liquid metering weirs or slots 20. The elongated weirs 20 which are spaced about 6" (15.24 cm) apart may be obround, rectangular, or V-shape apertures extending generally about 1 to 2⅜" (2.5 to 6.0 cm) in height and about 0.0394" to 0.118" (1 to 3 mm) in width and located at substantially the same level and distance of about ½" (1.27 cm) from the bottom of troughs.

The opposite ends of each trough are closed or sealed off by end support brackets or angle plates 22 fastened by welded thereto including horizontal flanges projecting therefrom and above the supporting ledge L of the tower.

Adjustable support means comprising a pair of adjustable bolts 24 including check nuts are threaded into and through the horizontal flange of end brackets 22 for engaging the ledge L, supporting and leveling the troughs 12 and the liquid distributor 10.

Extending longitudinally close and attached to each outer side of the troughs 12 by suitable means such as bolts and nuts 26 and spacers 28, are a pair of liquid distribution drip plates 30. Each drip plate 30 has an upper non-perforated vertical wall portion 32 spaced about ½ to 1½ times the width of the weirs or 0.0197" to 0.177" (0.5 mm to 4.5 mm) from the outer surface of the side wall 16 of the trough 12. The upper portion 32 of the liquid distribution drip plate 30 extends vertically substantially parallel to the outer surface of the side wall 16 from an outwardly projecting upper horizontal top flange to a short inwardly projecting intermediate horizontal shelf or wall portion 34. The upper or top horizontal surface of the horizontal shelf or wall portion 34 is preferably level within ±3°, spaced about 0.394 (10 mm) or more below the bottom of the side wall 16 and may extend 0.394 to about 1" (10 mm to 25 mm) away or inwardly from the adjoining side of the upper portion 32. The distribution drip plate 30 also has a lower serrated portion extending downwardly from a perforated side bend or portion including a plurality of equally spaced apertures 36 extending at an angle of about 45° at the junction with the short horizontal shelf 34. The lower serrated portion of the drip plate comprises a plurality of longitudinally and uniformly spaced drip portions, fingers, or strips 38 with drip edges disposed at various angles a, b and c relative to each other and the vertical plane of the drip plates 30 as shown in FIG. 4.

Typically, the drip portions, strips or fingers 38 are spaced about 1½" (3.81 cm) between centers and disposed at angles a, b and c of about 60°, 10° and 34° respectively to provide at least twelve (12) drip strips or points for every square foot (129 points/m$^2$) of cross sectional area of the tower chamber.

As shown in FIGS. 4 and 5 the drip strips or fingers 38 are arranged in repetitive pattern groups of three fingers each. Each repetative group has ⅓, one or a first one of the drip fingers 38 disposed outwardly away from the side of the trough at angle a, another ⅓ or second one is also disposed outwardly at the smaller angle b and the last ⅓ or third one of each group is disposed inwardly under the trough to the angle c.

Also shown in FIGS. 4, 5 and 10 the liquid distribution drip plate 30 has more and about twice the number of the apertures 36 than drip strips or portions 38 situated at the center of and above each of the drip strips 38 and the curved or arcuate liquid drip surfaces and edges extending between drip strips 38.

If desired the drip plates 30 on adjacent spaced troughs or on the same trough may be mounted or constructed so that the drip fingers 38 of the adjacent drip plates are either aligned with or preferably staggered relative to each other.

Liquid feed splitter means are provided for uniformly dividing and dispensing the initial incoming liquid flow delivered thereto by one or more feed pipes P, to each of the troughs 12. As shown the liquid feed splitter means 40 takes the form of a trough or elongated parting box 40 extending transversely and centrally across the lower receptacles or troughs 12 and below the outlet end of one or more feed pipes P.

The splitter 40 has a bottom 42, spaced upwardly extending side walls 44 including spaced weirs or apertures 46 and end walls or plates 48 closing off both ends thereof and is attached to and supported by the lower troughs or receptacles by adjustable leveling means 50. The leveling means 50 are comprised of bolts and check nut assemblies attached to upper flanges of the troughs and extending upwardly through apertures in side brackets fixed to sides of the splitter 40. Thus, the splitter 40 can be adjusted to a horizontal level position and thereby provide continuous liquid streams of uniform size and volume emerging from the weirs and into each of the troughs. Also, there is at least one but preferably two opposing weirs 46, one in each spaced side wall 44, for dispensing liquid into each of the trough 12 below.

Although the weirs 46 shown are triangular or V-shaped, they may be of any other known geometric shape, such as square, polygonal, rectangular, oblong, circular etc. Preferably, the weirs as apertures 46 are proportional in size and shape to proportion a required amount of liquid to each trough or receptacle and situated at the same level or horizontal plane above the bottom 42 of the splitter 40 regardless of the shape of the bottom 42 which may be flat, inclined curved or diverging etc.

The important aspect is that the bottom of the apertures or weirs 46 be of substantially the same shape and distance below the level of the liquid dispersed into the splitter 40 in order to produce and dispense liquid streams of substantially proportional size and volume into the receptacles 12 below.

In operation the low flow liquid distributor 10 receives a continuous controlled uniform supply or volume of liquid per unit of time dispensed by the feed pipes P into the liquid parting box 40. The liquid fed at a specified rate into the parting box 40 rises to a level above the bottom of the weirs 46 and the volume of liquid maintained above that level is continuously divided into a number of streams of substantially equal size and shape and dispensed equally into each of the lower troughs or receptacles 12.

Likewise, liquid dispensed to each of the receptacles or troughs 12 rises to a level above a plane on which the bottom of the weirs 20 are located and flows out of the metering weirs 20 in a greater number of equally spaced smaller streams of substantially equal size, shape and volume. The smaller streams flow outwardly from the troughs and against the closely spaced upper portion 32 of the liquid distribution drip plates 30 which causes the liquid to simultaneously spread out and drain downwardly to the horizontal wall or shell 34. The shelf 34 helps to disperse the liquid horizontally, fill and maintain a a portion of the lower volume of the narrow spaces between the wall portions 32 and side walls 16 of the troughs filled to a substantially uniform level either at or below the liquid level in the troughs 12.

Hence, once filled, a thin uniform layer of low liquid flow drains continuously downwardly over the horizontal shelf and through the narrow space between it and bottom of the side wall 32 to the side bend or perforated portion and apertures 36 at the junction with the drip strips 38. From this point a portion of the uniform volume and thin uniform layer of liquid flows over inner surfaces between the apertures 36, and drips from the inner peripheral edges of the drip finger 38 and the adjacent arcuate portions. Another substantially half portion of the uniform layer of liquid flows through the apertures 36 to and over opposite outer surfaces and drips from the outer opposite peripheral edges of the drip fingers 38 and adjacent arcuate portions.

Hence, the liquid flowing at a particularly low flow rate is uniformly distributed over the cross sectional area of the chamber and bed of packing media E below.

Referring to FIGS. 6 to 9, another modification or embodiment of the invention in the form of a liquid redistributor 60 of substantially the same diameter as distributor 10 is shown mounted within chamber C of the tower T, attached to and supported by a similar but lower ledge L' extending inwardly from the support wall W of the tower T.

The liquid redistributor 60 is smaller in many respects to the liquid distributor 10 in that it comprises some of the same elements which will be referred to by the same name or term and character primed. As shown the liquid distributor 60 is preferably adapted to be installed between supported beds of tower packing media E and E' within a liquid/gas contact tower chamber for the purpose of collecting liquid raining through perforated support plate or grid G from the bed E above and redistributing the liquid uniformly over the bed E' below and allowing gas to pass upwardly therethrough.

However, the redistributor 60 can be utilized with or without slight modification as a liquid distributor in substantially the same manner as distributor 10.

The liquid distributor or redistributor 60 comprises a plurality of or an array of receptacles or troughs 12' closed at outer ends by end plates 22' and attached liquid distribution drip plates 30' extending across the tower chamber and supported at the closed ends thereof by the ledge L.

Each of the receptacles or troughs 12 and liquid distribution drip plates 30' in distributor 60 are substantially identical in cross sectional shape and size to troughs 12 and plate 30 on distributor 10 with the exception that they are not as long and extend outwardly from opposite sides of a liquid feed splitter means extending transversely and centrally across and between flanged inner open ends of the troughs 12'.

The liquid feed splitter is preferably a U-shape channel or trough 70 with an inclined bottom wall 72, and spaced vertical side walls 74 extending upwardly from the bottom to outwardly extending short horizontal flanges at the open top side of the channel 70 narrower than the troughs 12'.

The narrow channel 70 extends diametrically across the chamber C and has one or an upper end closed off by a plate 76 and an opposite or open lower end, which may be likewise closed off, adapted to be connected to a drain pipe or conduit.

If desired or necessary to drain off a portion of the liquid feed collected, or over supplied, the lower open end portion of the channel 70 may be provided with bolt apertures, and connected by bolts, nuts and sealing material to a drain conduit or channel D as shown by phantom lines in FIG. 8 extending through the tower wall T to a conventional drain control valve means not shown. As shown in FIG. 8 each side wall 74 of the channel 70 has a plurality of rectangular apertures, openings or weirs 78 aligned with each of the inner flanged open ends of the receptacles or troughs 12' sealed with a suitable sealant or gasket and fastened thereto by bolt and nut assemblies 80. However, the inner ends of the troughs 12' could also be fastened thereto by welding or any other suitable means.

The bottom of the openings 78 which may be of another geometric shape are situated at substantially the same horizontal level, typically about 2¾" (6.98 cm) below the top of the channel 70 and trough 12 and in line with the central ridge of the diverging inclined bottom 14' of the receptacles or troughs 12'. As shown the rectangular weirs 78 are above the sloping bottom 72 of the channel 70 and may be as large but are preferably slightly smaller than the larger open ends of the trough or receptacles 12'.

As shown in FIGS. 6 and 8 the opposite upper and lower end portions of the channel 70 are clamped to the lege L' by bolt and nut assemblies 82 and the side liquid drain pans or plates 84 extending between each of the shorter outer side troughs 12' and the tower wall W. The threaded bolts are attached to and extend upwardly from the end portion of the upper short horizontal flange of the channel 70 engaging the underside of the ledge L' and through holes in the arcuate or segment clamp drain plates 84 clamped by the nuts to the ledge L'. A gasket or sealant of polytetrafluoroethylene or other suitable materials is preferably placed between the arcuate or segment plates and the ledge L' to prevent passage of down coming liquid therebetween.

Each of the segment or arcuate clamping and drain plates 84 extend from the sealed ledge L' to an inner down turned flange or edge portion extending into and adapted to drain liquid into the adjoining outer shorter side troughs 12' and channel 70.

Similarly each of the outer closed ends of the troughs or receptacles 12' are attached and clamped to the ledge L' by bolt and nut assemblies 86, short end clamping U-shape drain channels 88, and a polytetrafluoroethylene gasket or sealant material between the channels and the ledge L'. The bolts are attached to and extend upwardly from flanges at ends of the troughs engaging the underside of the ledge L', through the clamping channels 88 clamped by the nuts to the ledge L'.

In this construction the troughs and channel 70 and hence the distributor 60 may be leveled if necessary by inserting either shims or spacers between the troughs 14', channel 70 and the ledge L' and/or inserting thinner or thicker gaskets between the plates 84, the clamping drain channels 88 and the ledge L'.

As shown in FIG. 6 the short U-shape clamping drain channels or pans 88 extend between and are fastened to closed end portions of adjacent spaced receptacles or troughs 12' whereby the clamping U-shaped drain channel or pans 88 cover those end spaces, collect and drain the liquid to the adjacent troughs 12'.

The distributor 60 is also provided with liquid collector-dispensing means for covering the spaces between the trough 12', collecting liquid draining toward the spaces and dispensing the collected liquid into the central liquid feed splitter or channel 70 while allowing the rising gas to pass freely between and around the receptacles or troughs 12' to the bed of packing media above.

The liquid collector and dispensing means comprises a plurality of elongated shallow U-shaped pans 90 extending at an incline from upper open outer ends or edges adjacent the tower wall and above the channels 88 to inner lower outlet ends above channel 70.

Each of the shallow pans 90 has an inclined bottom 92, short up turn sides 94 and a plurality of support legs 96 fastened by bolts and nuts to the flanges 18 of adjacent troughs 12'. The pans 90 situated above the level of the troughs 12' and channel 70 are of greater width than the spaces between the troughs or receptacles, overlap the sides of adjacent troughs 12' and extend from an outer end thereof positioned above and between the sides of the clamping drain channels 88 to an opposite lower end situated beyond the adjacent side 74 of the channel 70.

Hence, the pans 90 collect that portion of the liquid raining down from above the spaces between troughs 12' and deliver it to the central liquid feed splitter channel 70 while the end clamping channels 88 collect and deliver still another liquid portion to adjacent receptacles or troughs 12' and the remaining portion is collected directly by the troughs 12' and the channel 70.

As liquid collects in the various troughs 12' and channel 70 it seeks and attains a common level in the distributor 60. When the level of the liquid rises above the common horizontal level of the metering weirs 20' in the troughs 12' it flows out in a number of small continuous streams of uniform size and volume against the upper portions 32' of liquid distributor drip plates 30'. The liquid spreads out and fills the lower space between the closely spaced walls 16' of the troughs or receptacles and upper portions 32' of the drip plates 30' to provide thin continuous uniform layers of liquid. There after the liquid layers flow downwardly over the horizontal shelfs and through apertures 36' and uniformly divided and distributed over the cross sectional area of the chamber C by the apertures 36' the drip fingers 38' and the surfaces and drip edges of the arcuate portions between the fingers 38' and the apertures 36' in the same manner as that of distributor 10 taught above.

If desired the redustributor 60 may be modified and ulitized as an initial distributor at the top of the tower by simply removing the collector drain pans 90, aligning the feed splitter channel 70 with the pipes P above and fastening it to the ledge L inthe same manner as it is fastened to a ledge L'. Further, it could be more extensively modified by replacing the end channels 88, the bolt and nut assemblies 86, and the intervening gaskets or sealant with end plates and leveling bolts and nut assemblies such as those indicated at 22 and 24 on distributor 10.

Another embodiment of a liquid distribution drip plate 30" is shown in FIG. 11. The liquid distribution drip plate 30" comprises an upper wall portion 32" with transverse liquid passages provided by scalloping or serrating the lower edge portion thereof and fastening or welding it to an upper intermediate surface portion of the horizontal cross wall portion 34" of a lower inverted U-shaped channel. Thus, the inverted U-shaped channel provides a pair of spaced lower serrated portions each with angularly disposed drip fingers 38" extending downwardly from two perforated side bends or portions including apertures 36" at both of the junctions with the horizontal cross wall portion 34" of the inverted U-shape channel projecting equal or different amounts from each side of the upper portion 32".

Although, the liquid distributors 10 and 60 could be formed of various plastic, ceramic or refractory materials they are preferably fabricated from sheet metal that resist attack by the elements in the environments to which they are subjected. The sheet metal may be carbon steel, stainless steel, nickel, copper, titanium (Monel, Inconel Reg. T.M.) and combination or alloys thereof. The various components are formed by cutting and bending to the desired configuration, punched to produce the spaces, apertures or weirs, and welding other portions thereof together.

The size of the various component of the distributor 10 and 60 are predetermined and arranged so that the distributors will occupy no more than 50% of the cross sectional area of the chamber C and thereby allow a free gas space of at least 50% of the cross sectional area of the chamber C around the components of the distributor.

A liquid distributor constructed in accordance with the invention is particularly useful for uniformly distributing a liquid flow at relatively low rates of from approximately 2.0 GPM/FT$^2$ (4.890 m$^3$/(hr.m$^2$)) down to 0.1 GPM/FT$^2$ (0.244 m$^3$/(hr.m$^2$)) of cross sectional area of a tower chamber.

In the liquid/gas contact tower the gas to be treated flows up through the bed of tower packing media wherein the uniformly distributed liquid is contacted by the gas and passes around the receptacles or troughs, drip plates and the splitter means without being entrained by or disrupting the liquid flowing out of the troughs and dripping uniformly from the distribution drip plates at the relatively low flow rates.

Although the liquid distributor 10 and redistributor 60 are primarily for low flow rates it is obvious that it can if desired be made to distribute liquid at greater flow rates. Liquid introduced at greater flow rates cause the level of the liquid to rise in the splitter and troughs and thereby increases the head of liquid, and the size and volume of the liquid streams in proportion to the size and area of the apertures and weirs.

Hence, the applicants' invention provides a liquid distributor and/or redistributor useful for distributing large as well as the preferably small amounts of liquid flow over the cross sectional area of a liquid/gas contact tower or the like.

Also, the design of the distributor may be other than the preferred multiple elongated receptacle or trough type embodiments disclosed hereinabove and in the accompanying drawings. For example, the distributor may be provided with one or more spaced annular or circular receptacles or troughs, including attached annular or circular drip plates, of different diameters arranged within and connected to one another by support means such as angularly spaced narrow radial support beams, or ribs or U-shape channels with ends thereof supported by the ledge L or L'. The annular or circular receptacle or trough and drip plate would have substantially the same cross sectional shape as the trough 12 and drip plate 30 and support a liquid feed splitter means similar to the splitter 40 in substantially the same manner shown in FIGS. 1 and 2.

Similarly, the liquid distributor or redistributor could be provided with a plurality of spaced semi circular troughs or receptacles and attached semi circular drip plates of substantially the same cross sectional shape as the trough 12' and drip plates 30'. The opposite ends of the semi-circular troughs would be sealingly fastened to a liquid feed splitter channel similar to the U-shape channel 70 and supported at opposite ends by the ledge L or L'.

Additional angular spaced narrow radial beams or U-shape channels would be provided to extend between and connect the semi circular receptacles or troughs and feed splitter channel to the support ledge L or L'. Used as a redistributor the collector drain pans would need to be of either circular or semi circular shape, and supported in similar manner above and between the circular or semi circular troughs or receptacles.

In applications where the tower chamber is of relatiavely small cross sectional size and area the liquid distributor may comprise a single annular or circular trough or annular receptacle with inner and outer circular side walls with weirs and drip plates attached thereto.

Figure 13:
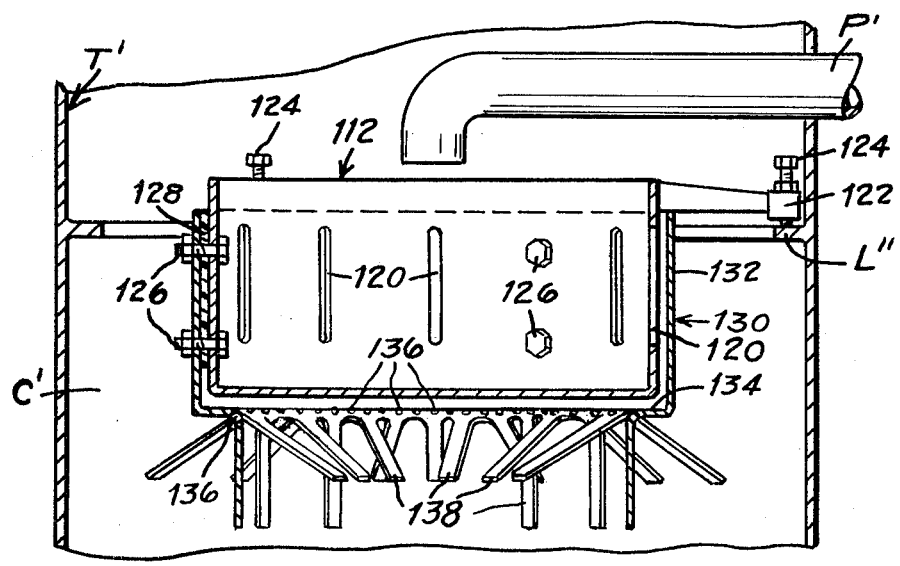
FIG. 13 is a cross sectional view taken on line 13—13 of FIG. 12 through the receptacle and liquid distribution drip plate.

However, in cases where the tower chamber is of exceptionally small cross sectional area the distributor may simply a circular trough or receptacle in the form of a container or pan having a bottom and a single outer circular wall with weirs therein and an attached circular drip plate as shown in FIGS. 12 and 13.

The low flow liquid distributor 100 shown in FIG. 12 and 13 extends over the cross sectional area of a chamber C' and is adapted to be supported by a ledge L" fixed to the wall W' of a tower T'.

As shown, the distributor 100 comprises a single circular container, receptacle or trough 112 including a bottom wall 114 and a single continuous annular or circular side wall 116 extending around and upwardly from the bottom wall.

A plurality of elongated liquid metering weirs, apertures or slots 120 angularly spaced around the side wall 116 and situated at a predetermined common distance or level above the bottom wall for dispensing liquid therethrough.

Means for supporting the distributor 100 are provided comprising a plurality of angularly spaced radial brackets, channels or rails 122 attached to and extending radially from the side wall 116 and over the ledge L" to ends thereof adjacent the wall W' of the tower. Each radial bracket 122 has a leveling bolt and lock nut assembly 124 extending therethrough into engagement with the ledge L" for supporting and leveling the distributor 100.

Fastening means including a plurality of angularly spaced bolt and nut assemblies 126 and spacers 128 are provided for attaching a continuous annular circular liquid distribution drip plate 130 to the side wall 116 of the receptacle 112.

The liquid distribution drip plate 130 has an upper wall portion 132 extending downwardly or vertically to a short horizontal wall portion or shelf 134 projecting therefrom to an outer side portion or bend including apertures 136 therein at the junction with a lower serrated portion including drip portions, fingers or strips 138.

As shown, the drip strips 138 are preferably equally angularly spaced around the central axis of the container 112 and drip plate 130, angularly disposed relative to one another and arranged in a repetitive pattern groups of three (3) drip fingers 138 in each group. Each repetitive group has a first intermediate drip finger 138 extending downwardly, a second outer finger 138 inclined outwardly toward the wall of the tower and a third inner finger 138 inclined toward the center of the chamber.

Hence, liquid feed dispensed directly into the receptacle 112 from feed pipe P' rises to a common level above the bottom of the weirs 120 and flows continuously out the weirs 120. From there the liquid contacts the upper portion 132, spreads horizontally and fills the narrow space between the side wall 116 and upper portion 132, flows downwardly in a thin continuous sheet and over the horizontal wall portion 134. The liquid then flows over one side of the lower serrated portion and drip fingers 138 and through the apertures 136 and over the opposite side of the serrated portion and drip fingers 138 and thereby uniformly distributed over the cross sectional area of the chamber C'.

Therefore, it is to be understood that term trough(s) and receptacle(s) in the claims is to be interpreted as including double wall troughs or receptacles that are straight, circular, semi circular or of any other known geometric configuration and single wall troughs or receptacles in the form of a container or pan of any geometric configuration having but one side wall, weirs therein, extending upwardly from and around a bottom wall and into which liquid is received for uniform distribution in the manner taught and claimed by the applicants.

As many possible embodiments and modifications may be made without departing from the intended scope and spirit of the invention, it is to be understood that the invention includes all embodiments, modifications and equivalents thereof falling within the scope of the appended claims.

We claim:

1. A liquid distributor adapted to be supported within a chamber of a liquid/gas contact tower and distribute liquid received therein at relatively low flow rates over a cross sectional area of the chamber comprising:
   at least one liquid receptacle situated in and extending over a portion of the cross sectional area of the chamber and adapted to receive, contain and dispense liquid therefrom having
   a bottom wall,
   a side wall extending upwardly from the bottom wall and
   at least one aperture in the side wall for dispensing liquid therethrough;
   support means on the distributor adapted to cooperate with a support fixed to the tower for supporting the distributor in the chamber;
   a liquid distribution drip plate supported adjacent to and extending along the side wall of the receptacle and having
   an upper portion extending horizontally and downwardly along and spaced from the side wall,
   an intermediate horizontal wall portion extending horizontally below an edge portion of the bottom wall adjoining the side wall of the receptacle and beyond at least one side of the upper portion to a side portion adjoining the horizontal wall portion and a lower serrated portion including a plurality of drip portions including drip edges extending downwardly from the side portion adjoining the horizontal wall portion
   whereby liquid received in the receptacle at a predetermined continuous feed rate is contained until it rises to a common level above the level of each aperture, flows continuously through and out each aperture toward and against the upper portion of the distributor drip plate which spreads the liquid horizontally and fills the narrow space between the upper portion thereof and the side wall of the receptacle to form a thin continuous uniform layer above and flowing continuously over the horizontal wall portion and downwardly over surfaces of the lower serrated portion and distributed by the drip portions and drip edges over a cross sectional area of the chamber.

2. A liquid distributor according to claim 1 wherein the receptacle comprises:
   a pair of spaced side walls extending upwardly from opposite side edge portions of the bottom wall and
   at least one aperture in each of the pair of spaced side walls and
   wherein a liquid distribution drip plate is supported adjacent to and extends along each of the pair of spaced side walls of the receptacle.

3. A liquid distributor according to claim 2 further comprising:
   a plurality of spaced receptacles and the distribution drip plates each extending over a portion of the cross sectional area of the chamber.

4. A liquid distributor according to claim 3 further comprisisng:
   liquid feed splitter means situated adjacent the receptacles and adapted to receive, contain, divide and dispense liquid deposited therein to each of the receptacles.

5. A liquid distributor according to claim 4 wherein the liquid feed splitter means comprises:
   a bottom wall,
   a pair of spaced opposite side walls extending upwardly from the bottom wall and apertures in the pair of spaced sidewalls for dividing and dispensing the liquid to each receptacle.

6. A liquid distributor according to claim 5 wherein the drip portions on the lower serrated portion of each of the liquid distributor drip plates are
   longitudinally spaced and angularly displaced relative to each other.

7. A liquid distributor according to claim 6 wherein each liquid distributor drip plate further comprises:

a plurality of apertures extending through the side portion adjoining the horizontal wall portion and the lower serrated portion whereby a portion of the liquid can flow through the apertures to and downwardly over opposite surfaces and edges of the drip portions.

8. A liquid distributor according to claim 7 wherein each of the plurality of spaced liquid receptacles and the liquid distribution drip plates extend transversely beneath the feed splitter means and longitudinally across a portion of the cross sectional area between opposite sides of the chamber and each receptacle having opposite closed ends supported by the support fixed to the tower.

9. A liquid distributor according to claim 7 wherein the plurality of spaced receptacles and the liquid distribution drip plates extend longitudinally between opposite sides of the splitter means and an inner wall of the tower and each receptacle having an outer end closed off and supported by the support fixed to the tower, and an inner open end attached to a side wall of the splitter means and adjacent an aperture therein through which liquid flows from the splitter means into the receptacle.

10. A liquid distributor according to claim 9 further comprising:

a plurality of liquid collector drain pans extending above and covering spaces between the spaced receptacles, inclined downwardly to lower ends thereof situated above and between the sidewalls of the splitter means whereby the liquid distributor may be supported by another support fixed to the liquid contact tower between upper and lower beds of tower packing media in the chamber, collect liquid draining from the upper bed into the receptacles, the feed splitter means and the inclined pans draining into the feed splitter means whereupon liquid collected rises to a common level and flows out the apertures in the receptacles, spreads out against the distribution drip plate and continues downwardly to the drip portions and edges and thereby redistributed over the cross sectional area of the chamber.

11. A liquid distributor according to claim 10 wherein the liquid feed splitter means comprises:

a channel having spaced side walls, and an inclined bottom wall extending between the side walls and downwardly from an upper closed end to a lower open end of the channel adapted for connection to a drain conduit and control valve means for draining off any over supply of liquid thereto and thereby maintain a desired level of liquid in the distributor and rate of liquid distribution over the cross sectional area of the chamber.

12. A liquid distributor according to claim 1 wherein the distributor comprises:

a single receptacle having a single outer side wall, including apertures, extending upwardly from and around the bottom wall and wherein the liquid distribution drip plate is spaced from and extends around the single outer side wall of the single receptacle.

* * * * *